United States Patent
Apel et al.

(10) Patent No.: US 6,912,003 B1
(45) Date of Patent: Jun. 28, 2005

(54) METHODS OF AND CIRCUIT ARRAY FOR COMPENSATING VARIATIONS INDUCED BY TEMPERATURE STRAIN AND MANUFACTURE IN CMOS VIDEO SENSORS

(75) Inventors: Uwe Apel, Talstrasse (DE); Ulrich Seger, Im Dobel (DE); Heinz-Gerd Graf, Im Dobel (DE); Udo Postel, Leutewitzerstrasse (DE); Hans-Jörg Schönherr, Hainichener Strasse (DE); Armin Armbruster, Plettenbergstrasse (DE)

(73) Assignee: Institute for Mikroelektronik, Stuttgart (DE)

( * ) Notice: Subject to any disclaimer, the term of this patent is extended or adjusted under 35 U.S.C. 154(b) by 0 days.

(21) Appl. No.: 09/402,109

(22) PCT Filed: Oct. 30, 1997

(86) PCT No.: PCT/DE97/02528

§ 371 (c)(1),
(2), (4) Date: Jul. 7, 1997

(87) PCT Pub. No.: WO99/03262

PCT Pub. Date: Jan. 21, 1999

(30) Foreign Application Priority Data

Jul. 7, 1997 (DE) .......................... 197 29 001

(51) Int. Cl.[7] .............................................. H04N 9/64
(52) U.S. Cl. ...................... 348/243; 348/313; 257/294; 250/208.1
(58) Field of Search .................. 348/241, 243, 348/244, 242, 245, 246, 247, 251, 313; 257/291; 250/208.1

(56) References Cited

U.S. PATENT DOCUMENTS

| | | | | |
|---|---|---|---|---|
| 3,952,144 A | * | 4/1976 | Kolker | 358/406 |
| 4,839,729 A | * | 6/1989 | Ando et al. | 348/241 |
| 5,376,966 A | * | 12/1994 | Takase | 348/243 |
| 6,130,712 A | * | 10/2000 | Miyazaki et al. | 348/243 |

FOREIGN PATENT DOCUMENTS

| | | | | |
|---|---|---|---|---|
| EP | 0469878 A1 | 2/1992 | | |
| EP | 0569063 A1 | 11/1993 | | |
| JP | 56-161777 | * 12/1981 | ............ | H04N/1/40 |

* cited by examiner

Primary Examiner—Ngoc-Yen Vu
Assistant Examiner—Chriss S. Yoder
(74) Attorney, Agent, or Firm—St. Onge Steward Johnston & Reens LLC

(57) ABSTRACT

A method and circuit for compensating variations induced by temperature, strain and manufacturing technology in CMOS video sensors. Using at least two reference CMOS sensors, held at the same temperature level as the CMOS video sensors to be compensated and which are not irradiated, two reference signals are generated whereof one corresponds to a reference dark value whilst the other one, in response to the application of an electric current, corresponds to a reference illumination value. The reference signals are amplified separately of each other. At least one correction value is stored in a memory unit for each CMOS video sensor point to be compensated, such that output signals corrected by FPN (=fixed pattern noise) will be obtained. The FPN-corrected output signals as well as the reference signals obtained are supplied to the A/D converter where the output signals of the CMOS video sensor are compensated and converted into digital signals.

9 Claims, 2 Drawing Sheets

METHODS OF AND CIRCUIT ARRAY FOR COMPENSATING VARIATIONS INDUCED BY TEMPERATURE STRAIN AND MANUFACTURE IN CMOS VIDEO SENSORS

FIELD OF THE INVENTION

The invention relates to a method of as well as a circuit array for compensating variations induced by temperature, strain and manufacturing technology in CMOS video sensors exposed to radiation and generating electrical output signals as a function of the irradiation energy, which output signals are subject to a logarithmic characteristic.

PRIOR ART

In the prior art publications "A 128×128 Pixel Standard CMOS Image Sensor with Electronic Shutter" by Chye Huat Aw and Bruce A. Wooley in: IEEE JOURNAL OF SOLID-STATE CIRCUITS, vol. 31, No. 12, December 1996, as well as the German Patent DE 42 09 536 C2 CMOS video sensors are described producing output signals which furnish a logarithmic image of the irradiation energy impinging on the photosensitive pixels. The output characteristics, however, are subject to variations in terms of operating voltage, technology and temperature so that the series reproducibility of the measuring results is ensured only under restricted marginal conditions. Studies into the behaviour of these receivers in transmission and a possible compensation of the aforedescribed influencing variables may be found, for instance, in "Ermittlung und Kompensation des Temperaturverhaltens eines optischen Signalaufnehmers" by Jochen Reiter, thesis for a master's degree, 1997, Institut fuer Netzwerk- und Systemtheorie, Stuttgart university. To ensure a better comprehension of the specific dependencies which an output signal of such HDRC video sensors is subjected to, the behaviour of an HDRC video sensor in transmission will be explained briefly in the following.

The output characteristic of an HDRC pixel can be defined as follows:

$$UAL = UO - VAL \cdot UT \cdot (\log (IO/(Ie + Idark)) + \log KFPN) \quad (1)$$

wherein:
UAL logarithmic output voltage of a pixel cell
UO DC voltage operating point of a pixel cell (operating voltage and technology parameters)
VAL internal amplifier of a pixel cell (technology parameter, factor for UT, furnishes mV/dec signal deviation)
UT temperature voltage
IO cell-internal saturation current value (operating voltage and technology parameter)
Ie photocurrent in the sensor cell, which is in correspondence with the radiation energy for the pixel [$W/m^2$] via the parameter s
Idark thermally generated dark current in the sensor cell, limited as a function of temperature, technology and geometry for elevated temperature in the operating area in the dark
s sensitivity of a pixel [$A*m^2/W$] technology and geometry parameter)
KFPN pixel-related technology parameter (generates the "fixed pattern noise" FPN)

As can be derived from this equation (1) the irradiation energy impinging on a pixel is imaged on a logarithmic scale. The description of the pixel transfer characteristic displays, however, various dependencies which render an assessment of the irradiation energy more difficult without knowledge and compensation of the influencing parameters due to technology.

BRIEF DESCRIPTIONS OF THE INVENTION

The problem underlying the present invention consists in a precise detection of the temperature response of these HDRC sensors over a wide operating range in terms of temperature and brightness and in the development simple algorithms or provisions of compensation, respectively, by derivation from the typical behaviour in transmission. The circuitry needed to this end should be designed in complete technological compatibility with the circuitry concept of these specific CMOS video sensors. The solution to this problem is defined in claim 1 which relates to an inventive method of compensating variations induced by temperature, voltage as well as manufacturing technology in CMOS video sensors. claim 5 relates to a circuit array for implementing the method. Features improving the inventive idea are the subject matters of the dependent claims.

The inventive method of compensating variations induced by temperature, voltage as well as manufacturing technology in CMOS video sensors exposed to irradiation and generating electrical output signals as a function of the irradiation energy, which signals are subject to a logarithmic characteristic, excels itself by the combination of the following steps of method:

Using at least two reference CMOS sensors, which are held at the same temperature level as the CMOS video sensors to be compensated and which, however, are not irradiated, two reference signals are generated whereof one corresponds to a reference dark value whilst the other one, in response to the application of an electric current, corresponds to a reference illumination value. The reference signals so generated are amplified separately of each other such that the amplifying conditions are identical with the amplification of the output signals to be compensated. The reference signals, which display a temperature response identical with the response of the electric output signals of the CMOS video sensors to be compensated, are supplied to an A/D converter. At least one correction value is stored in a memory unit for each CMOS video sensor point to be compensated, which correction value is suitable to compensate variations induced by manufacturing technology and which is applied to the respective output signal to be compensated such that output signals corrected by FPN (=fixed pattern noise) will be obtained.

The FPN-corrected output signals as well as the reference signals so obtained are supplied to the A/D converter where the output signals of the CMOS video sensor are compensated and converted into digital signals.

The inventive circuit array according to claim 5 serves to implement the method.

A metallising layer is used to cover the area on a video sensor chip accommodating the reference sensors. The opaque reference pixel cells, which have a structure comparable, preferably identical, with the structure of the photosensitive pixel cells and which allow for a defined external supply of currents, reproduce a precise "photocurrent generation" in correspondence with a defined irradiation level.

These reference pixel cells may be designed as both individual elements or as a compound so that a representative reference value will be obtained by taking the mean of several equally excited pixels. The equation of transmission of the reference pixel furnishing the illumination value may be defined as follows:

$$UAR = UO - VAR \cdot UT \cdot (\log(IO/(Iset+Idark)) + \log KFPN) \qquad (2)$$

wherein:
UAL logarithmic output voltage of a reference pixel cell
VAR internal amplification of a pixel cell;
Iset "photocurrent" impressed into the reference pixel cell from outside The reference pixel cell for the dark value, by contrast, does not require an external power supply; the reference voltage is rather determined by the temperature-dependent dark current.

On principle, the offset, which is to be corrected for each cell by the fixed-pattern noise (FPN), can be determined versus the direct output value of the dark reference.

An adaptation of the dark reference value by means of an offset correction circuit in analogy with the correction performed for all video cells entails the advantage that it is possible to operate on a minimum bit width for the digital correction value, due to an adaptation of the dark value voltage UTK(dark) to the distribution of the FPN offset, so that memory space can be saved. When at least one further element is integrated on the dark value reference on the chip, which, with an impressed current Iset, represents a sensibly usable illumination value, it becomes possible to derive the reference voltage range (full scale) of an A/D converter used for conversion, using the difference between two reference output values:

$$\Delta UAR = VAR \cdot UT \cdot (\log (IH/ID) + \log KFPNH/KFPND)$$

wherein:
IH photocurrent in the sensor cell furnishing the illumination value
ID photocurrent in the sensor cell furnishing the dark value
KFPNH pixel-related technology parameter for the sensor cell furnishing the illumination value
KFPND pixel-related technology parameter for the sensor cell furnishing the dark value From equation (3) it becomes apparent that on account of the subtraction the parameters UO and IO are no longer relevant for an analysis. The difference between the output voltages of two reference sources generates the linear map of the chip temperature and hence a linear temperature response of the reference voltage at the A/D converter.

Operating points required from a technological point of view and their variations are eliminated by the subtraction.

BRIEF DESCRIPTION OF THE DRAWING

The invention will now be described in more details in the following by an with reference to the drawing wherein.

DESCRIPTION OF EMBODIMENTS

Figure 1:
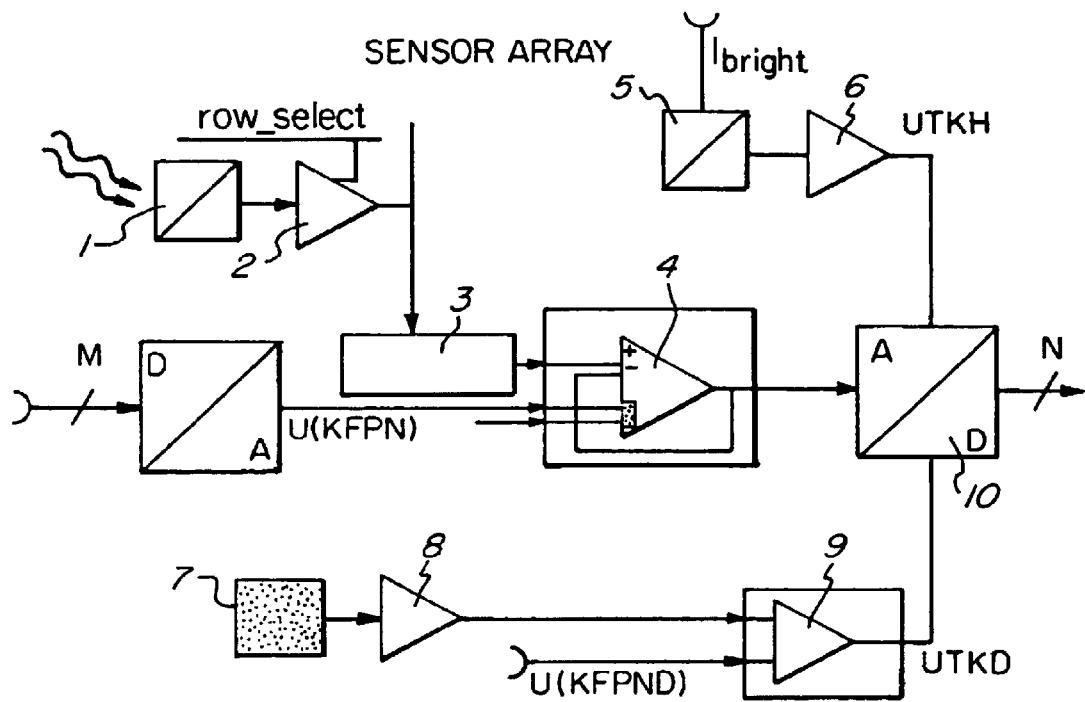
FIG. 1 is a basic circuit diagram of the circuit array.

The circuit array illustrated in FIG. 1 comprises a video sensor 1 to be compensated which is exposed to variations determined by temperature, voltage and manufacturing technology. The output signal of the video sensor 1 is amplified in a joining amplifier unit 2 and supplied via a column decoder 3 to a video amplifier 4. For the generation of the desired reference value a reference sensor 5 is provided, on the one hand, which comprises an external power supply so that the output signal of the reference sensor 5 corresponds to a defined irradiation level. The illumination value obtained in this manner is applied, by means of an amplifier 6, with the illumination value voltage UTKH to an A/D converter 10.

For the generation of a corresponding dark reference value a reference sensor 7 is used which, in a manner identical with the reference sensor 5, is at the same temperature level but to which a corresponding external controlling current is not applied for the generation of a defined irradiation level. The reference dark value output by the reference sensor 7 is equally amplified by means of an amplifier 8 and supplied to a correction circuit 9, together with a correction voltage U (KFPND) corresponding to a pixel-related technological parameter, with a corrected dark value voltage UTKD being applied on the output of the correction circuit 9 and supplied on an input to the A/D converter 10.

For the compensation of variations induced by manufacturing technology in the individual video sensors, correction values having a bit width M and originating from a memory unit not shown in FIG. 1 are applied to a D/A converter unit which converts this value into the corresponding correction voltage U(KFPN). The correction voltage is supplied to an additional differential input stage of the video amplifier 4. With the provisions the output signal of the video sensor array (the video signal) is compensated by the offset voltage which is individually defined for each picture element and which is induced by variations of individual technological parameters.

Figure 2:
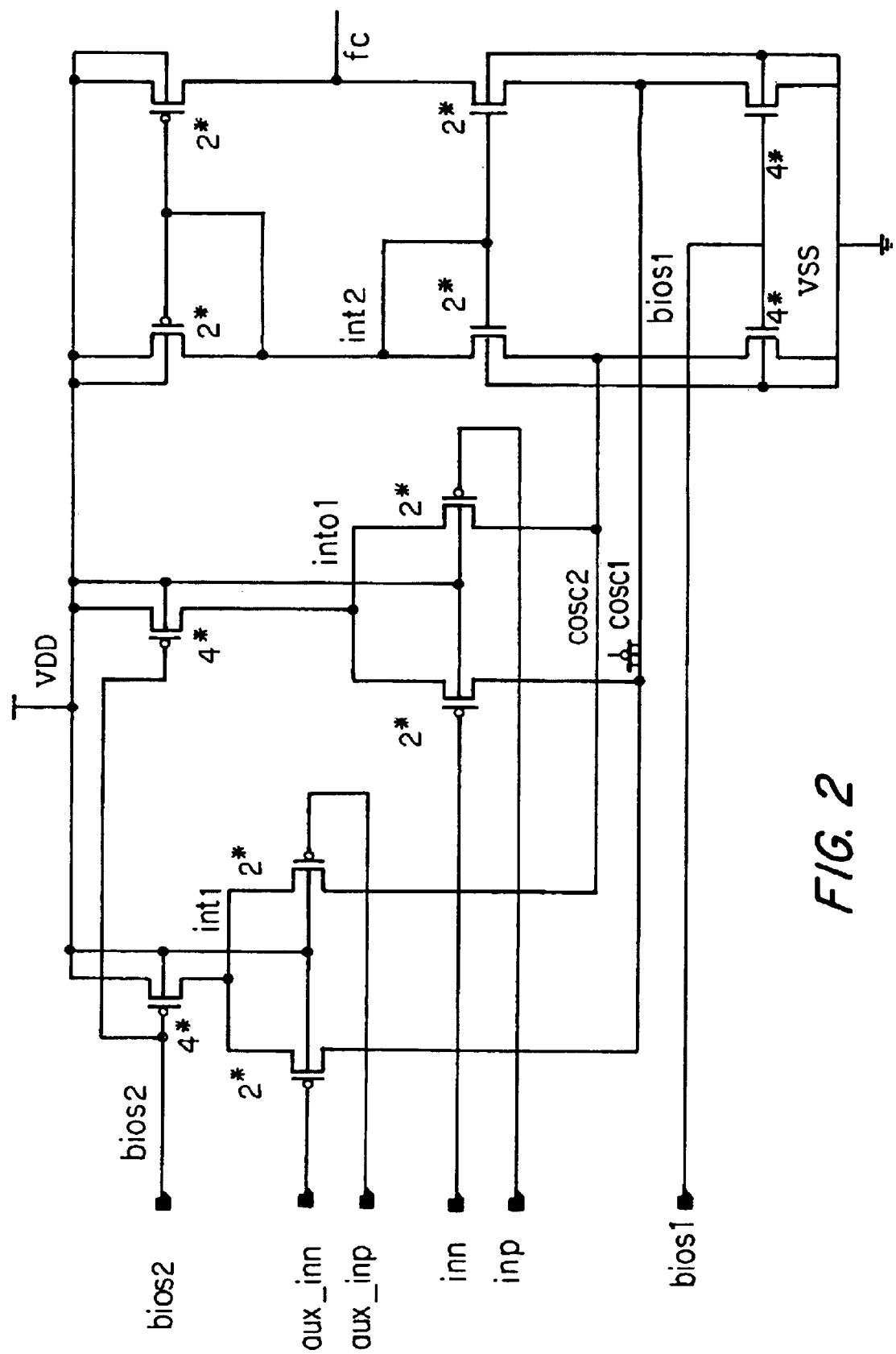
FIG. 2 shows a basic circuit diagram of an extended video amplifier circuit.

FIG. 2 illustrates an exemplary solution for the functional assembly of a video amplifier with an analog offset correction input, which is shown in FIG. 1. The two right branches constitute a regular folded-cascode circuit which is common in CMOS amplifier technology (cf. for instance K. R. Laker and W. M. C. Sansen: "Design of Analog Integrated Circuits and Systems", McGraw-Hill, 1994, page 588). The left branch, with is designed as additional differential stage with a gain of less than 1, causes the selective application of an offset to the video signal when the correction voltage values are applied. The inverting input of this additional differential stage is set to a reference level, typically VDD/2, whilst the FPN correction signal generated and derived from the A/D converter is applied to the non-inverting input, which correction signal encompasses a voltage range of several 100 mV symmetrical relative to VDD/2. The precise signal deviation is derived from the dispersion of the offset error (FPN to be corrected of the individual video pixels and from the gain of the additional differential input stage.

Here Bias1 and Bias2 are externally generated bias voltages for adjusting the sources of electric power in the differential main input stage as well as for the additional input stage, to which the signals aux_inn or Aux_inp, respectively, are applied. fc is the output node connected to a joining driver stage. The other designations in this illustration are internal node designators.

Figure 3:
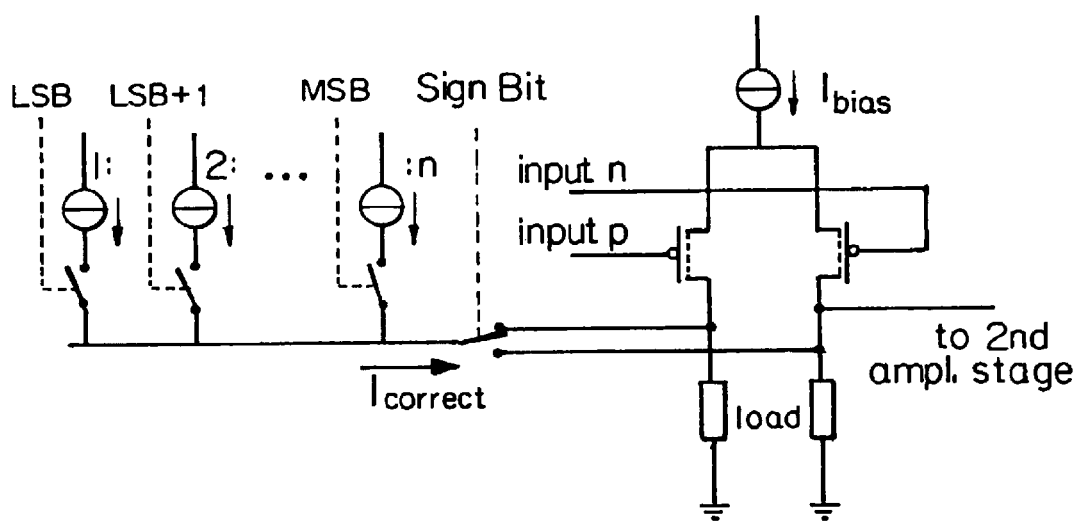
FIG. 3 illustrates a basic circuit diagram of a correction circuit with digital input.

FIG. 3 shows a circuit array solution for the FPN correction to be performed in the video amplifier with a minimum expenditure in terms of devices. The additional differential input stage, which is shown in FIG. 2 and which ensures an additional supply of currents into the nodes case1 and case2 of the folded-cascode amplifier circuit, is replaced here by a number of sources of electric power with a binary weighting. The source providing the lowest defined of current is controlled by the rightmost bit (least significant bit).

Depending on the value of the sign bit of the correction value the additional current is supplied into case1 or case2 where it creates a positive or negative offset on the video signal. The amount of the offset voltage has a linear relationship with the current intensity which is adjusted by opening and closing the switches underneath the respective sources of electric power. The individual switch positions are determined directly by the stored correction values. Hence the intermediate step of correction voltage generation by means of an A/D converter is eliminated, which correction voltage must in its turn be converted into currents via the additional differential input stage. The differential input stage shown in FIG. 3 corresponds to the main differential input stage of the folded-cascode circuit in FIG. 2 (central branch).

What is particularly remarkable is the configuration of the internal video amplifier 4 with the additional differential input stage 4' or as set of connected sources of electric power in a binary graduation, respectively, so that an on-chip offset correction can be performed in the analog signal path. The amplification of this additional branch is designed to be substantially smaller than 1 whilst the characteristics of the original amplification branch via the great differential input stage are not impaired by the additional assembly. A defined offset which can be adjusted separately for each pixel is applied to the original video signal in this circuit. The advantage resides in the aspect that the range of conversion of the joining A/D converter can be restricted to the actual video signal deviation whereas in the case of correction via the digital video data a higher number of bits must be provided to cover the correction range.

With a configuration of the video amplifier circuit in correspondence with FIG. 2 the analog correction values must be externally generated, by means of a D/A converter, from the FPN correction data stored in the ROM memory, for the respective pixel actually addressed.

Both gate terminals of the additional differential input stage are connected to external terminals and the reference input is internally biased to half the supply voltage. The reference voltage value can be checked from the outside via directly connected pad and can be defined by an external voltage source, if necessary.

The correction values can be determined, for instance, by calibration of the output values with uniform illumination (or complete darkening) of the sensor chip. In this operation first the centre of gravity of the halftone levels should be determined by means of a histogram in order to be able to make full use of the possible calibration calibration range of approximately ± 60 mV. This calibration can be implemented in an iterative steps for each pixel by tracking the correction signal until the output reaches the target value. The correction value should be within the range of 2.5 V ± 0.5. In calibration the correction signal should be generated by means of the D/A converter which will be used later on in regular operation.

What is claimed is:

1. Method of compensating variations induced by temperature, strain and manufacturing technology in CMOS video sensors exposed to radiation and generating electrical output signals as a function of the irradiation energy, which output signals are subject to a logarithmic characteristic, characterised in that at least two reference CMOS sensors are used, which are held at the same temperature level as the CMOS video sensors to be compensated and which are not irradiated, however, to generate two reference signals whereof one corresponds to a reference dark value whilst the other one, in response to the application of an electric current, corresponds to a reference illumination value, that said reference signals so generated are amplified separately of each other such that the amplifying conditions are identical with the amplification of the output signals to be compensated, that said reference signals, which display a temperature response identical with the response of the electric output signals of the CMOS video sensors to be compensated, are supplied to an A/D converter, that at least one correction value is stored in a memory unit for each CMOS video sensor point to be compensated, which correction value is suitable to compensate variations induced by manufacturing technology and which is applied to the respective output signal to be compensated such that output signals corrected by FPN (=fixed pattern noise) will be obtained, and that the FPN-corrected output signals as well as the reference signals so obtained are supplied to said A/D converter where the output signals of the CMOS video sensor are compensated and converted into digital signals.

2. Method according to claim 1, characterised in that a reference CMOS sensor is supplied with an external electric current for the generation of said reference illumination value, which current reproduces a precise photocurrent generation in correspondence with a defined irradiation energy.

3. Method according to claim 1, characterised in that for achieving said reference dark and illumination values a plurality of reference CMOS sensors is employed which produce reference signals whereof the mean is taken.

4. Method according to claim 1, characterised in that with application of said reference signals to said A/D converter by means of dynamic tracking the full usable range of conversion of said A/D converter is utilised.

5. Circuit array for compensating variations induced by temperature, strain and manufacturing technology in CMOS video sensors exposed to radiation and generating electrical output signals as a function of the irradiation energy, which output signals are subject to a logarithmic characteristic, characterised in that in addition to the CMOS video sensor to be compensated at least two reference CMOS sensors are provided, which are covered by the irradiation and which are held at the same temperature level as the CMOS video sensors to be compensated and which generate two reference signals whereof one corresponds to a reference dark value whilst the other one, in response to the application of an electric current, corresponds to a reference illumination value, that an amplifier unit is connected to join each reference CMOS sensor, which is respectively identical with an amplifier unit provided for the output signals to be compensated, that a memory unit is provided where at least one correction value is stored for each CMOS video sensor point to be compensated, which correction value is suitable to compensate variations induced by manufacturing technology and which is applied to the respective output signal to be compensated such that output signals corrected by FPN (=fixed pattern noise) will be obtained, and that an A/D converter is provided which converts the compensated output signals into digital signals.

6. Circuit array according to claim 5, characterised in that a correction unit is provided where the correction values from said memory unit are combined with the output signals from said CMOS video sensor and where said output signals are subjected to an FPN correction.

7. Circuit array according to claim 6, characterised in that said correction unit is a video amplifier stage with an additional differential input stage.

8. Circuit array according to claim 7, characterised in that the gain of said additional differential input stage is less than 1.

9. Circuit array according to claim 5, characterised in that a further independent correction circuit is provided for the offset correction of said dark reference values.

* * * * *

UNITED STATES PATENT AND TRADEMARK OFFICE
CERTIFICATE OF CORRECTION

PATENT NO. : 6,912,003 B1
DATED : June 28, 2005
INVENTOR(S) : Apel et al.

Page 1 of 1

It is certified that error appears in the above-identified patent and that said Letters Patent is hereby corrected as shown below:

Title page,
Item [75], Inventors, please delete and add:
-- (75) Inventors: Uwe Apel, Neckartalfingen (DE);
                 Ulrich Seger, Magstadt (DE);
                 Heinz-Gerd Graf, Magstadt (DE);
                 Udo Postel, Dresden (DE);
                 Hans-Jörg Schönherr, Dresden (DE);
                 Armin Armbruster, Geisingen (DE) --.

Signed and Sealed this

Twenty-seventh Day of September, 2005

JON W. DUDAS
*Director of the United States Patent and Trademark Office*